United States Patent

[11] 3,601,496

| [72] | Inventor | Bobbie G. Kemp<br>113 Cumberland Shore Drive,<br>Hendersonville, Tenn. 37075 |
|---|---|---|
| [21] | Appl. No. | 853,275 |
| [22] | Filed | Aug. 27, 1969 |
| [45] | Patented | Aug. 24, 1971 |

[54] ROOF BLOWER DEVICE
7 Claims, 6 Drawing Figs.

[52] U.S. Cl. .................................................. 415/146,
416/44, 98/116, 416/139
[51] Int. Cl. .................................................. F01d 17/00,
F04d 25/08
[50] Field of Search ........................................ 415/146;
416/44, 53, 139, 131, 146; 98/43, 116

[56] References Cited
UNITED STATES PATENTS
2,079,942  5/1937  Velle ............................ 416/143

| 2,153,604 | 4/1939 | Wheller...................... | 416/146 |
|---|---|---|---|
| 2,917,227 | 12/1959 | Ruegsegger .................. | 416/139 |
| 3,213,304 | 10/1965 | Landberg et al............... | 416/139 |
| 330,753 | 11/1885 | Trullinger..................... | 415/146 |

FOREIGN PATENTS

| 304,514 | 1/1929 | Great Britain................ | 416/44 |
|---|---|---|---|
| 302,953 | 12/1928 | Great Britain................ | 416/131 |

*Primary Examiner*—Henry F. Raduazo
*Attorney*—Harrington A. Lackey

ABSTRACT: A roof blower device including a power-driven rotary frame having a plurality of vanes pivotally and serially mounted around the circumference of the frame in overlapping relationship in closed position. The rotary frame is mounted in an annular air passage so that when the frame is stationary the vanes are closed, and when the frame is rotated the overlapping vanes are swung radially outward by the centrifugal motion of the frame to open the annular air passage.

PATENTED AUG 24 1971
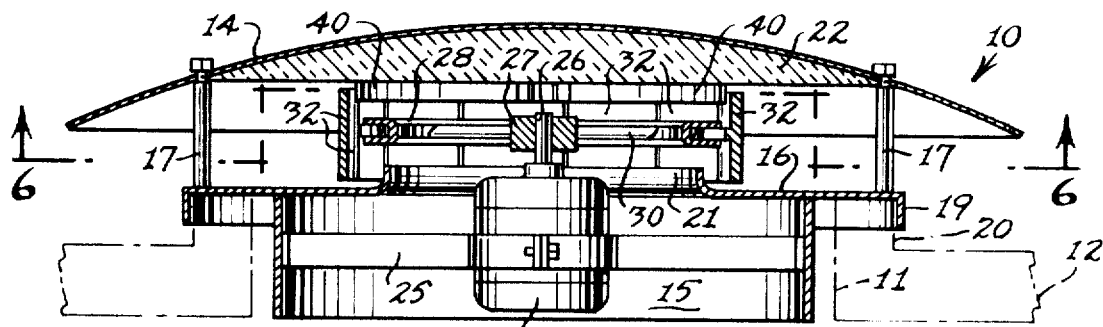
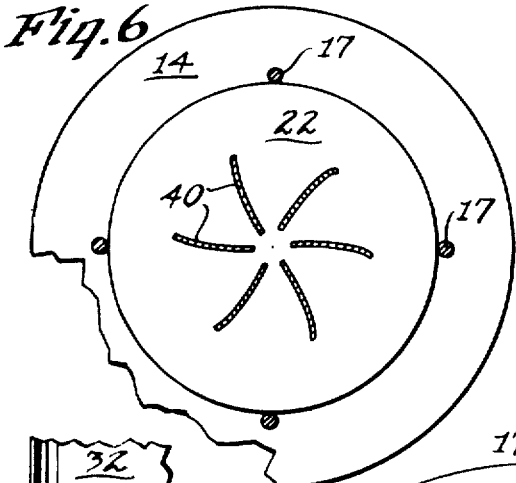
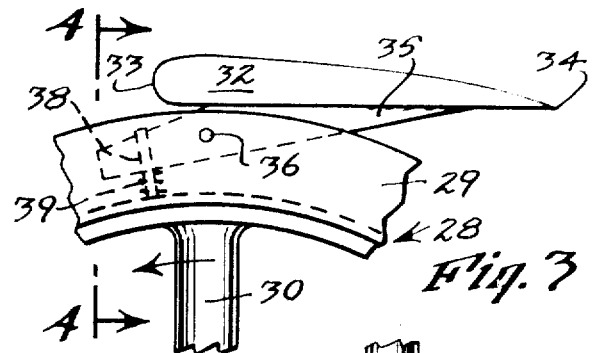
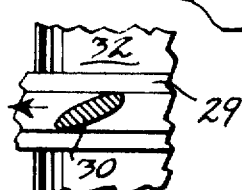
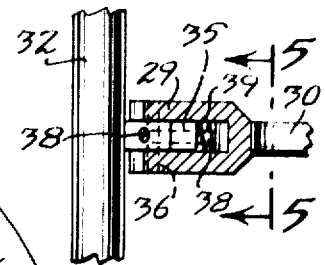
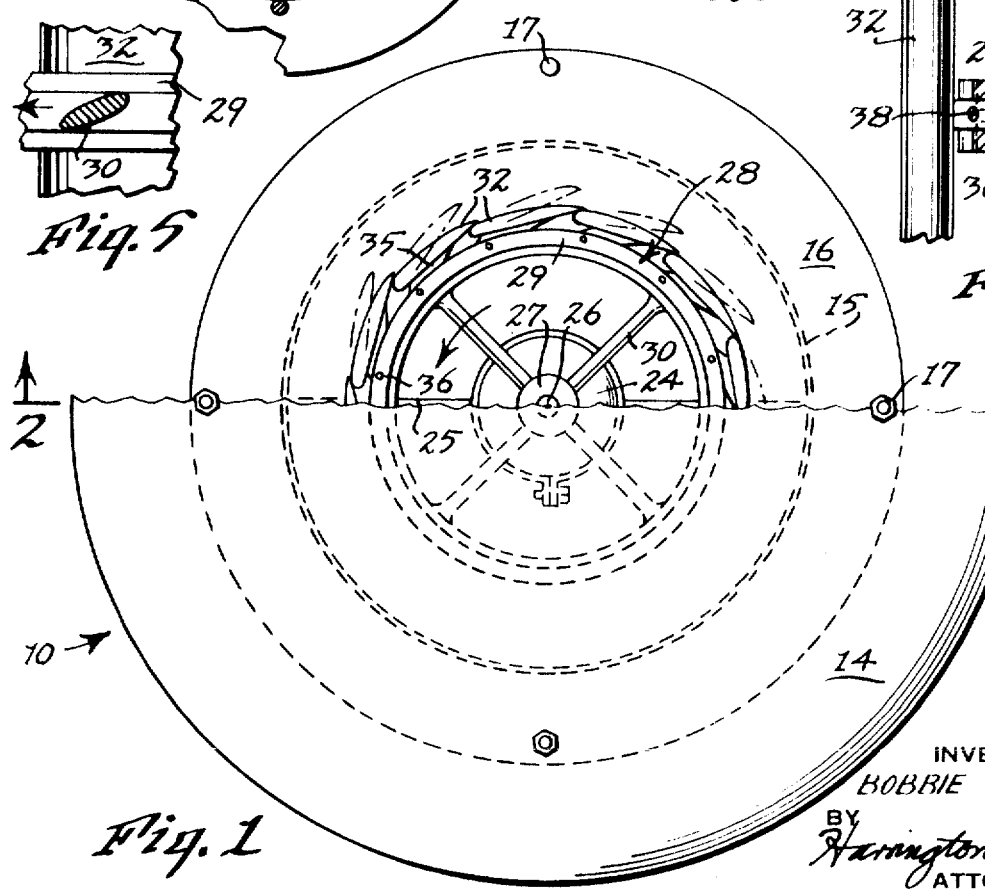
INVENTOR:
BOBBIE G. KEMP
BY Harrington A. Lackey
ATTORNEY

ROOF BLOWER DEVICE

BACKGROUND OF THE INVENTION

This invention relates to a blower device, and more particularly to a blower having vanes adapted to automatically open and close an air passage.

Heretofore, rotary fans or blowers of various types have been mounted in the vent openings of roofs to exhaust air from the interior of buildings to the atmosphere. It is customary, and often mandatory, to provide a back draft damper in the vent opening to eliminate the back draft of cold air into the building when the blower is not operating. Furthermore, it is also necessary to provide a bird screen around the circumferential air passage between the customary cowl and the roof, in order to prevent the entry of birds, insects and leaves, or other debris through the vent opening when the blower is inoperative.

SUMMARY OF THE INVENTION

The blower device made in accordance with this invention eliminates the necessity of the back draft damper and bird screen, referred to above, by incorporating the specially designed blower vanes which automatically open the air passage when the blower is operative and will automatically close the vent opening when the blower is inoperative.

This blower device includes a power-driven rotary frame in which a plurality of overlapping vanes are pivotally mounted upon the periphery of the frame. The vanes are of uniform width to form a cylindrical closure for the annular air outlet passage defined between the roof and the cowl. Each vane is pivotally mounted to the periphery of the frame about a pivotal axis which is not only parallel to the rotary axis of the frame, but is located between the center of mass of the vane and its leading edge, so that the centrifugal force resulting from the rotary movement of the frame will cause the trailing edge of each vane to swing radially outward about its pivotal axis. Each vane is spring biased to return to its normal closed position when the rotary frame is stopped.

The annular air outlet passage is open only when the vanes are swung open by the rotary motion of the frame. When the frame is stopped, the vanes automatically close the roof vent opening to simultaneously eliminate back draft as well as the entry of birds, insects or other foreign matter.

BRIEF DESCRIPTION OF THE DRAWINGS

FIG. 1 is a top plan view of the roof blower made in accordance with this invention, with the cowl shown fragmentarily;

FIG. 2 is a section taken along the line 2—2 of FIG. 1 showing the cowl in place;

FIG. 3 is an enlarged fragmentary plan view of a single vane mounted in open position upon the rotary frame;

FIG. 4 is a fragmentary section taken along the line 4—4 of FIG. 3;

FIG. 5 is a section taken along the line 5—5 of FIG. 4;

FIG. 6 is a fragmentary section taken along the line 6—6 of FIG. 2.

DESCRIPTION OF THE PREFERRED EMBODIMENT

Referring now to the drawings in more detail, FIGS. 1 and 2 disclose a blower device 10, supported in the vent opening 11 of the roof 12 of a building.

The blower device 10 includes a mounting frame or housing made up of several parts, including a cowl 14, an annular or cylindrical inlet air conduit 15, an annular hanger plate 16 and spacer support rods 17. The inlet conduit 15 is preferably cylindrical and of a diameter slightly less than the inner diameter of the vent opening 11 so that the inlet conduit 15 is received concentrically within the vent opening 11. The inlet conduit 15 is fixed by welding or otherwise, at its top edge to the bottom surface of the annular hanger plate 16. The outer periphery of the hanger plate 16 is preferably provided with a depending annular flange 19, of a diameter greater than the diameter of the inlet conduit 15, and slightly greater than the outer diameter of the boss or lip 20 of the roof vent opening 11, so that the hanger plate 16 may be supported upon the boss in concentric relationship. A circular opening is provided in the center of the hanger plate 16 and defined by the upturned circular rim 21.

The cowl 14 is dished or turned concave downward and supported concentrically above the rim 21 by the spacer rods 17. The outer diameter of the cowl is great enough to adequately cover the vent opening 11 from the elements of the weather. The cowl 14 may also be provided with a layer of insulation material 22 fixed to its bottom surface above the vent opening 11, to provide insulation against heat and cold, but also to absorb excessive sound from the operation of the roof blower device 10.

An electric motor 24 is disclosed in the drawing as being supported in the center of the air inlet conduit 15 by a motor bracket 25. The motor shaft 26 is directly coupled to the hub 27 of a rotary frame, disclosed in the form of a spider wheel 28 having an annular rim 29 connected to the hub 27 by the radial spokes 20. The rim 29 is disclosed in the form of a circular channel opening radially outward.

Pivotally mounted around the rim 29 are a plurality of vanes 32 of uniform width, and preferably of uniform length. Each vane 32 has a general airfoil shape with a rounded or arcuate leading edge 33 and a tapered trailing edge 34, as best disclosed in FIG. 3. Extending forward and fixed to the bottom surface of each vane 32 is an arm 35. The arm 35 of each vane 32 is adapted to be freely received within the channel-shaped rim 29, and secured therein by a pivot pin 36 extending transversely of the walls of the channel rim 29 and through an intermediate portion of the arm 35. The pivot 36 permits free pivotal or swinging movement of the arm 35 and the vane 32 relative to the rim 29. Furthermore, the pivotal axis of the pin 36 is parallel to the rotary axis of the frame 28, which, as disclosed in the drawings, is the axis of the motor shaft 26.

The pivotal axis of the pin 36 is also located circumferentially between the center of the combined mass of the vane 32 and arm 35, and the leading edge 33 of the vane 32. Such location of the pivotal axis 36 is mandatory since the centrifugal force exerted upon the vane 32 by the rotary movement of the frame 28 acts radially outward through the center of mass, and thereby creates a moment about the axis of the pivot pin 36 to swing the trailing edge 34 outward from the frame 28.

The free end of the arm 35, that is the end of the arm 35 on the opposite side of the pivot pin 36 from the vane 32, is provided with an adjustable stop pin 38. The pin 38 is preferably threaded to threadedly engage a registering threaded opening extending generally radially through the free end of the arm 35. As disclosed in FIG. 3, the inner end of the stop pin 38 engages the bottom of the channel rim 29 to limit the outward movement of the vane 32. By screwing the stop pin 38 in and out of its registering opening in the arm 35, the outward limit of swinging movement of the vane 32 may be determined. A coil spring 39 may be disposed about the stop pin 38 and compressed between the bottom of the channel rim 29 and the inner surface of the arm 35. Consequently when the frame 28 is stopped, and no centrifugal force is exerted upon the vane 32, the compressed spring 39 will urge the arm 35 outward to swing the vane 32 clockwise as viewed in FIG. 3 until the trailing edge 34 abuts against the next adjacent leading edge 33 of the next trailing vane 32.

With each trailing edge 34 overlapping the next leading edge 33 of each successive vane 32, the vanes 32 will define a substantially cylindrical closure for the annular air outlet passage defined between the rim 21 and the bottom surface of the insulating cowl layer 22. The tolerance between the upper and lower edges of the vanes 32 relative to the annular rim 21 and the bottom surface of insulating layer 22 need not be very precise for the majority of uses of the roof blower device 10.

The amount of air which leaks past the upper and lower edges of vanes 32 is negligible compared to the volume of air handled and the amount of space in the interior of the building covered by the roof 12. Furthermore, the tolerances do not have to be very great to eliminate the entry of birds through the vent opening 11.

If desired, a plurality of radially extending vanes 40 may be fixed upon the bottom surface of the insulation layer 22 concentric with the rotary axis of the frame 28. The stationary vanes 40 are gradually curved to assist in directing the air outward through the open vanes 32.

Although the drawing discloses the motor 24 as being located within the housing 15–16, and directly driving the rotary frame 28, nevertheless the motor 24 could be located outside the housing, and connected to the hub 27 by any conventional transmission mechanism.

Although the rotary frame 28 may have different forms, nevertheless the spider wheel 28 disclosed in the drawing permits the free axial movements of air from the inner passages 15 upward between the spokes 30. The spokes 30 preferably have an airfoil shape which is disclosed in FIG. 5, and disposed at an angle so that its leading edge is depressed or closer to the inlet passage 15 than the trailing edge of the spoke 30. In this manner, the spokes 30 will have a minimum resistance to the flow of air through the housing 15–16–17.

It should also be understood that various forms of rims 29, and means for pivotally mounting the vanes 32 upon the rims, can be employed with equal facility.

The operation of the invention is apparent from the above description. After the housing 14–15–16–17 is installed in an opening 11 in the roof 12 of a building, the vanes 32 will be disposed in their normal closed position, as disclosed in solid lines in FIGS. 1 and 2. Consequently, the vent opening 11, will be effectively closed to the passage of air, except for minor air losses around the upper and lower edges of the vanes 32. Accordingly, back draft is effectively eliminated to minimize the loss of hot or cool air from the space within the building, depending upon the season of the year. Furthermore, the closed vanes 32 will eliminate the entry of birds, insects, and other pests, as well as foreign matter, such as leaves and other large solid particles.

When it is desired to ventilate the interior of the building covered by the roof 12, the electrical motor 24 is energized by means, not shown, to rotate the frame 28 in the direction of the arrow disclosed in FIG. 1. By virtue of the pivot pin 36 being located circumferentially forward of the center of mass of each vane 32, the resulting centrifugal force swings the vanes 32 to their outward phantom position disclosed in FIG. 1. In the open position, the trailing edges 34 of the vanes 32 are moved outward from the adjacent leading edges 33 of the next trailing vanes 32 to permit discharge of air from within the housing radially outward to the atmosphere. The discharge of air will continue so long as the frame 28 is rotating. However, when the motor 24 is deenergized, the coil springs 39 bias all of the vanes 32 to their original closed position disclosed in solid lines in FIG. 1.

As disclosed in FIGS. 1 and 2, the assembly and compactness of the device 10 is such that it may be completely prefabricated and assembled and merely fitted over the existing vent opening 11 in a minimum of time.

What is claimed is:

1. A blower device adapted to be mounted within a housing having at one end an axial inlet air passage, and at the other end, an annular outlet air passage, comprising:
   a. a rotary annular frame adapted to be rotatably mounted within the housing coaxially of the inlet air passage,
   b. a plurality of vanes of uniform axial width, each vane having a leading edge and a trailing edge,
   c. means mounting said vanes serially and circumferentially on said frame so that each trailing edge overlaps the leading edge of the adjacent trailing vane in closed position to form substantially a cylinder the height of which equals said uniform width,
   d. said mounting means further comprising pin means supporting a portion of each vane between its center of mass and its leading edge to pivot about an axis on said frame parallel to the rotary axis of said frame,
   e. means on said frame normally biasing each vane to said closed position, and
   f. motive means for rotating said frame in the housing in the direction of the leading edges of said vanes, whereby the resulting centrifugal forces swing said trailing edges away from said adjacent leading edges to an open position in fluid communication with the annular outlet passage, the interior of said frame being in fluid communication with the inlet air passage.

2. The invention according to claim 1 in which said vanes are of uniform length and said pivotal axes are equally spaced from each other and from said rotary axis.

3. The invention according to claim 1 in which said mounting means comprises adjustable stop means to limit outward swinging movement of said trailing edges.

4. The invention according to claim 2 in which said mounting means further comprises an arm having one end fixed to each vane and its other end free, said pin means comprising a pin pivotally securing each arm to said frame, said stop means comprising a stop pin adjustably supported in the free end of each arm to engage said frame at the maximum limit of said open position, said biasing means comprising a spring compressed between said frame and the free end of each arm urging said arm radially outward.

5. The invention according to claim 4 in which said frame comprises an annular channel rim opening radially outward for receiving said arm, said stop pin and said spring.

6. The invention according to claim 2 in which said frame is substantially a spider wheel having an annular rim, a hub, and a plurality of spokes connecting the hub and the rim, said rim supporting said vanes, said hub being operatively connected to said motive means, and each spoke having substantially the cross section of an airfoil, with its leading edge closer to the inlet passage than said trailing edge.

7. The invention according to claim 1 further comprising said housing having said axial inlet air passage at one end of said housing and said outlet annular air passage at said other end of said housing, and further comprising outlet vanes fixed in said housing adjacent and on the opposite side of said frame from said inlet passage to direct air through said outlet passage.